United States Patent
Rising, III (10) Patent No.: US 7,116,836 B2
(45) Date of Patent: Oct. 3, 2006

(54) METHOD AND APPARATUS FOR ENHANCING AN IMAGE USING A WAVELET-BASED RETINEX ALGORITHM

(75) Inventor: Hawley K. Rising, III, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 783 days.

(21) Appl. No.: 10/350,593

(22) Filed: Jan. 23, 2003

(65) Prior Publication Data

US 2003/0138161 A1   Jul. 24, 2003

Related U.S. Application Data

(60) Provisional application No. 60/350,936, filed on Jan. 23, 2002.

(51) Int. Cl.
*G06K 9/40* (2006.01)

(52) U.S. Cl. ................ 382/254; 382/240; 382/274; 382/275; 358/1.2; 358/3.26; 358/3.27

(58) Field of Classification Search ........... 382/240, 382/252, 274, 275; 358/1.2, 3.26, 3.27
See application file for complete search history.

(56) References Cited

U.S. PATENT DOCUMENTS

| | | | | |
|---|---|---|---|---|
| 5,581,370 A | * | 12/1996 | Fuss et al. | ............ 358/447 |
| 5,991,456 A | | 11/1999 | Rahman et al. | |
| 6,038,339 A | * | 3/2000 | Hubel et al. | ............ 382/162 |
| 6,396,948 B1 | | 5/2002 | Lynch et al. | |
| 6,741,753 B1 | * | 5/2004 | Moroney | ............ 382/274 |
| 6,804,409 B1 | * | 10/2004 | Sobol et al. | ............ 382/274 |

OTHER PUBLICATIONS

Brainhard, D. H, et al. "Analysis of the retinex theory of color vision," Journal of the Optical Society of America, vol. 3, No. 10, Oct. 1996, pp. 1651-1661.

Funt, Brian, et al., "Retinex in Matlab," The Eight Color Imaging Conference: Color Science, Systems, and Applications, School of Computing Science, Simon Fraser University, Burnably, British Columbia, Canada, pp. 10 pages.

Hurlbert, A. C., "The Computation of Color," Submitted to the Department of Brain and Cognitive Sciences in partial fulfillment of the requirements for the Degree of Doctor of Philosophy at the Massachusetts Institute of Technology, Sep. 1989, 208 pages.

Meijster, A., et al., "A Proposal for the Implementation of a Parallel Watershed Algorithm," University of Groningen, Institute for Mathematics and Computing Science, The Netherlands, 6 pages.

(Continued)

*Primary Examiner*—Samir Ahmed
*Assistant Examiner*—Yosef Kassa
(74) *Attorney, Agent, or Firm*—Blakely, Sokoloff, Taylor & Zafman LLP (57) ABSTRACT

Image data identifying multiple pixels in an image is received, and a multi-resolution hierarchical structure is created from the image data. Further, output values are calculated for the pixels in the image using a wavelet-based retinex algorithm by propagating pixel values computed at lower resolution levels of the multi-resolution hierarchy to higher levels of the multi-resolution hierarchy and refining the propagated pixel values at the higher resolution levels.

32 Claims, 5 Drawing Sheets

OTHER PUBLICATIONS

Rising, Hawley, K., III, "Analysis and Generalization of Retinex by Re-casting the Algorithm in wavelets," Sony NSCA-Media Processing Division, San Jose, CA,. 4 pages.

Sweldends, W., et al., "Building Your Own Wavelets at Home," Department of Mathematics, University of South Carolina, 30 pages.

* cited by examiner

METHOD AND APPARATUS FOR ENHANCING AN IMAGE USING A WAVELET-BASED RETINEX ALGORITHM

RELATED APPLICATIONS

This application is related to and claims the benefit of U.S. Provisional Patent application Ser. No. 60/350,936 filed Jan. 23, 2002, which is hereby incorporated by reference.

FIELD OF THE INVENTION

The invention relates to image processing in general. More particularly, the invention relates to a method and apparatus for enhancing an image using a wavelet-based retinex algorithm.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Sony Electronics, Inc., All Rights Reserved.

BACKGROUND OF THE INVENTION

The quality provided by digital technologies has created a huge demand for digital products in general. Part of this digital revolution is the increased popularity of digital images. It is now possible to use a digital camera to capture an image and reproduce the image on some sort of display media using a personal computer (PC) monitor or high resolution printer. It has even become common practice to incorporate digital images into "web pages" available over a network such as the Internet and World Wide Web, or to send a digital image to another PC via electronic mail.

At the heart of this digital image revolution are image processing systems. These systems process the captured digital image to enhance the clarity and details of the image using sophisticated image processing algorithms. The use of these algorithms result in images that are substantially more accurate and detailed than previously achieved using older analog methods.

However, when compared to the direct observation of scenes, color images in general have two major limitations due to scene lighting conditions. First, the images captured and displayed by photographic and electronic cameras suffer from a comparative loss of detail and color in shadowed zones. This is known as the dynamic range problem. Second, the images are subject to color distortions when the spectral distribution of the illuminant changes. This is known as the color constancy problem. A commonly encountered instance of the color constancy problem is the spectral difference between daylight and artificial (e.g., tungsten) light which often is sufficiently strong.

Since human vision does not suffer from these various imaging drawbacks, it is reasonable to attempt to model machine vision based on human vision. A theory of human vision centered on the concept of a center/surround retinex was introduced by Edwin Land in "An Alternative Technique for the Computation of the Designator in the Retinex Theory of Color Vision," Proceedings of the National Academy of Science, Volume 83, pp. 3078–3080, 1986. Land drew upon his earlier retinex concepts disclosed in "Color Vision and The Natural Image," Proceedings of the National Academy of Science, Volume 45, pp. 115–129, 1959, but harmonized these with certain findings of the neurophysiology of vision. All of the retinex concepts were intended to be models for human color perception. The earlier retinex concepts involved "random walks" across image space and the resetting of the computation when color boundaries were crossed. Land's 1986 retinex concept of human vision was proposed as a center/surround spatial computation where the center was 2–4 arc-minutes in diameter and the surround was an inverse square function with a diameter of about 200–250 times that of the center.

Applications of Land's human vision theories to image processing resulted in several versions of the retinex algorithm. One recent version of the retinex algorithm is a computer-based version described by John McCann in "Lessons Learned from Mondrians Applied to Real Images and Color Gamuts," Proceedings of IS&T/SID Seventh Color Imaging Conference, pp. 1–8, 1999. This version of the retinex algorithm (referred to herein as McCann '99 retinex) operates by creating a multi-resolution hierarchy from the input image data and computing lightness at each level of the hierarchy. Specifically, McCann '99 retinex begins lightness computations at the top level (i.e., the most highly averaged level of the hierarchy). After lightness values are computed at a reduced resolution, they are propagated down, by pixel replication, to a next level of the hierarchy as initial lightness estimates at that level. Further pixel comparisons refine the lightness estimates at the higher resolution level and then those new lightness estimates are again propagated down a level in the hierarchy. This process continues until computations are completed for the hierarchy's bottom level.

Although the McCann '99 retinex involves more computationally efficient spatial comparisons than a majority of its predecessors, its speed is still relatively slow and it fails to provide control over diffusion properties of the image.

SUMMARY OF THE INVENTION

Image data identifying multiple pixels in an image is received, and a multi-resolution hierarchical structure is created from the image data. Further, output values are calculated for the pixels in the image by propagating pixel values computed at lower resolution levels of the multi-resolution hierarchy to higher levels of the multi-resolution hierarchy and refining the propagated pixel values at the higher resolution levels.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
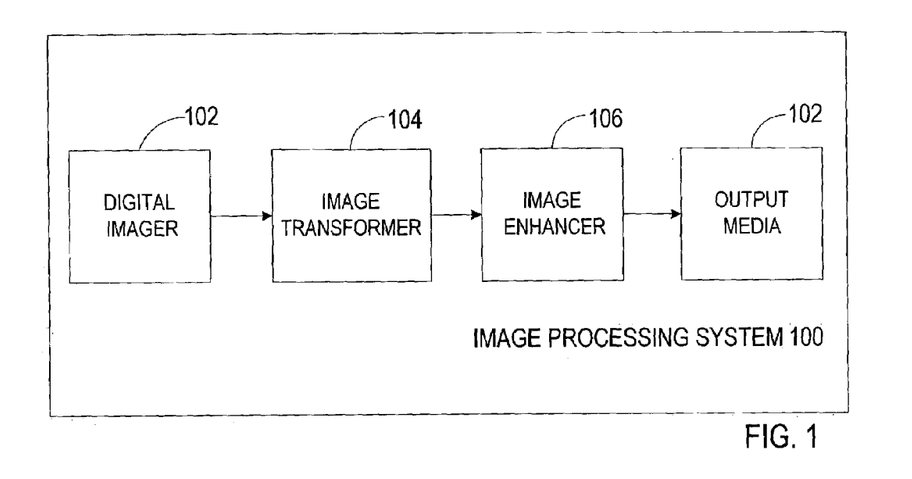
FIG. 1 is a block diagram of one embodiment of an image processing system.

Beginning with an overview of the operation of the invention, FIG. 1 illustrates one embodiment of an image processing system 100. The image processing system 100 includes a digital imager 102, an image transformer 104, an image enhancer 106, and an output media 108. The digital imager 102 may be a CCD camera or any other imaging device that is capable of capturing and digitizing images. The output of the digital imager 102 is a digital image represented by discrete areas referred to as pixels.

The image transformer 104 is responsible for transforming image data. In one embodiment, the image transformer 104 assigns a YUV value to each pixel in the image, transforming the image to YUV space, with Y representing luminance, U a first color, and V a second color. The Y value controls the brightness for that particular pixel. Current systems typically utilize eight bits to represent the Y value due to bandwidth efficiency and memory design considerations. Therefore, conventional image processing systems assign each pixel a Y value somewhere in the range of 0 to 235, with 0 representing the darkest luminance and 235 representing the brightest luminance.

The image enhancer 106 is responsible for enhancing the image using a wavelet-based retinex algorithm. The wavelet-based retinex algorithm is defined by rewriting a multi-resolution retinex algorithm (referred above as McCann '99 retinex) using a wavelet-based transform algorithm, as will be described in more detail below. According to the wavelet-based retinex algorithm, the image enhancer 106 creates a multi-resolution data hierarchy for the image by sub-sampling the image down until its dimensions reach predefined minimum dimensions and then reconstructs the image from the multi-resolution hierarchy. The image enhancer 106 reconstructs the image by performing pixel computations at the top level (i.e., the lowest resolution level) using the wavelet-based retinex algorithm, propagating these pixel computations to a lower level of the hierarchy where they are refined by iteratively applying the wavelet-based retinex algorithm to each pixel, and then continuing with this process until completing computations at the bottom level (i.e., the highest resolution level) of the hierarchy. In one embodiment, the image transformer 104 performs the reconstruction process in each spatial domain. Alternatively, the image transformer 104 may perform the reconstruction process only in selective domains (e.g., only in the Y domain).

The output media 108 is responsible for presenting the enhanced image to the user. The output media 108 may be, for example, a printer, a monitor, an LCD display, etc.

Figure 2:
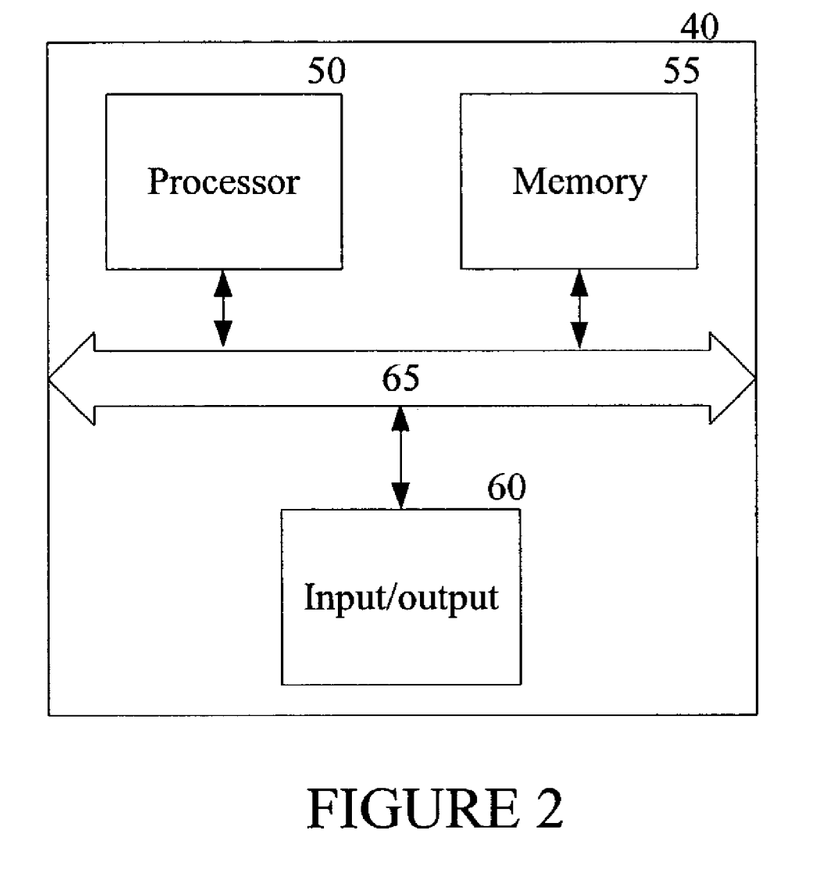
FIG. 2 is a block diagram of a computer environment suitable for practicing the invention.

The following description of FIG. 2 is intended to provide an overview of computer hardware and other operating components suitable for implementing the invention, but is not intended to limit the applicable environments. FIG. 2 illustrates one embodiment of a computer system suitable for use as an image enhancer 106 of FIG. 1.

The computer system 40 includes a processor 50, memory 55 and input/output capability 60 coupled to a system bus 65. The memory 55 is configured to store instructions which, when executed by the processor 50, perform the methods described herein. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the system 40 is controlled by operating system software executing in memory 55. Input/output and related media 60 store the computer-executable instructions for the operating system and methods of the present invention. The image enhancer 106 shown in FIG. 1 may be a separate component coupled to the processor 50, or may be embodied in computer-executable instructions executed by the processor 50. In one embodiment, the computer system 40 may be part of, or coupled to, an ISP (Internet Service Provider) through input/output 60 to transmit or receive image data over the Internet. It is readily apparent that the present invention is not limited to Internet access and Internet web-based sites; directly coupled and private networks are also contemplated.

It will be appreciated that the computer system 40 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Next, the particular methods of the invention are described with reference to flow diagrams in FIGS. 3 and 4 that illustrate processes performed by the image enhancer 106. The processes may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer-programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 3 and 4 without departing from the scope of the invention and that no particular order is implied by the arrangement of blocks shown and described herein.

Figure 3:
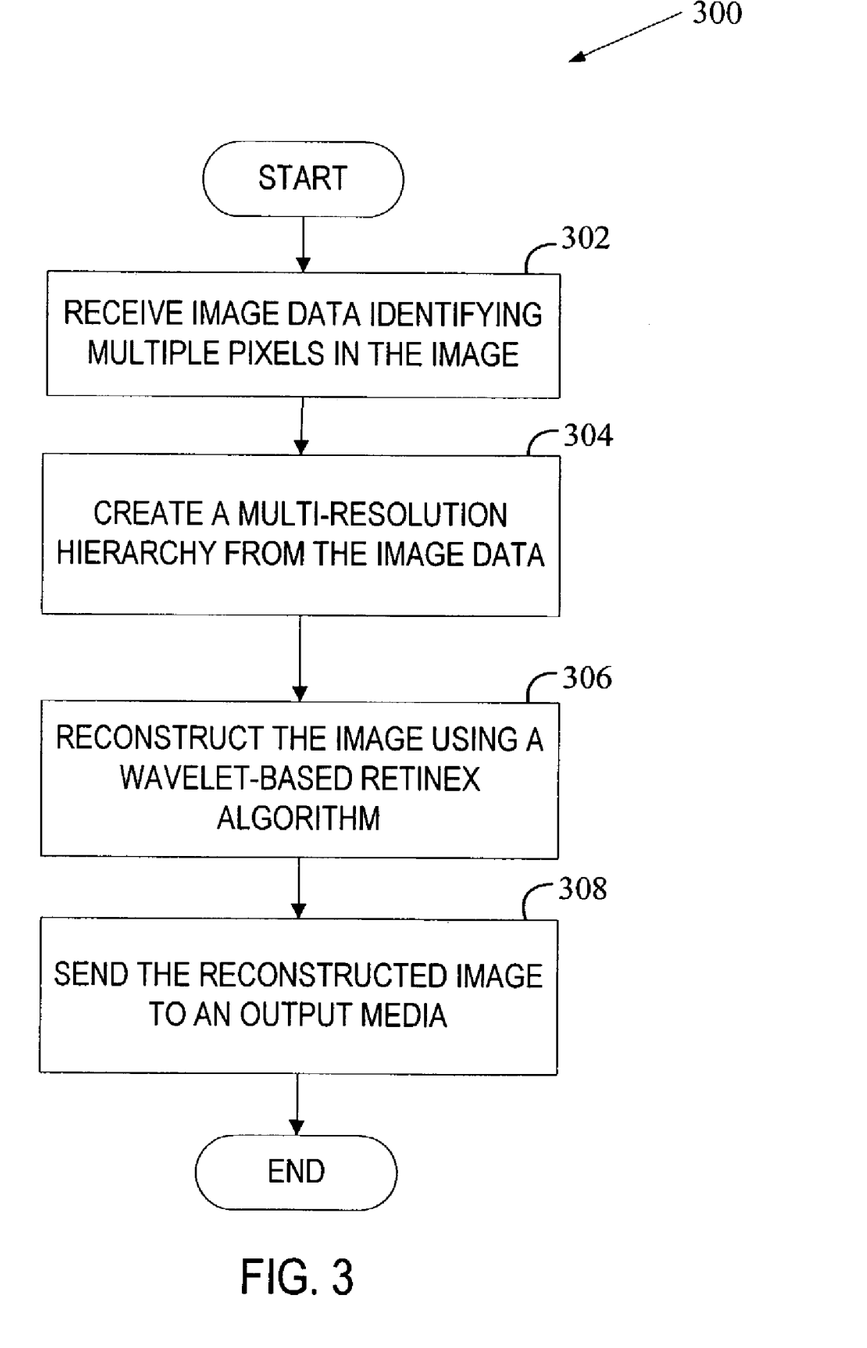
FIG. 3 is a flow diagram of one embodiment of a method for processing an image using a wavelet-based retinex algorithm.

FIG. 3 is a flow diagram of one embodiment of a method 300 for enhancing an image. Initially, method 300 begins with processing logic receiving image data identifying multiple pixels in the image (processing block 302). At processing block 304, processing logic creates a multi-resolution hierarchy from the image data. In one embodiment, the multi-resolution hierarchy is created by sub-sampling the image down until its dimensions reach predefined minimum dimensions. In one embodiment, a multi-resolution hierarchy is created in each spatial domain (e.g., in each of domains Y, U and V). Alternatively, the multi-resolution hierarchy is created only in selective domains (e.g., in the Y domain).

At processing block 306, processing logic reconstructs the image using a wavelet-based retinex algorithm, as will be discussed in more detail below in conjunction with FIG. 4. The wavelet-based retinex algorithm is a modified McCann '99 retinex algorithm that uses a wavelet transform. The wavelet transform may be a Haar transform or any other wavelet transform known in the art. As will be discussed in greater detail below, in one embodiment, operational parameters of the wavelet-transform algorithm can be adjusted to tune to properties of a specific image. In one embodiment, the operational parameters of the wavelet-transform algorithm can be adjusted to control diffusion properties and shapes of the image.

At processing block 308, processing logic sends the reconstructed enhanced image to an output media (e.g., a printer, a display, etc.) for presentation to the user.

Figure 4:
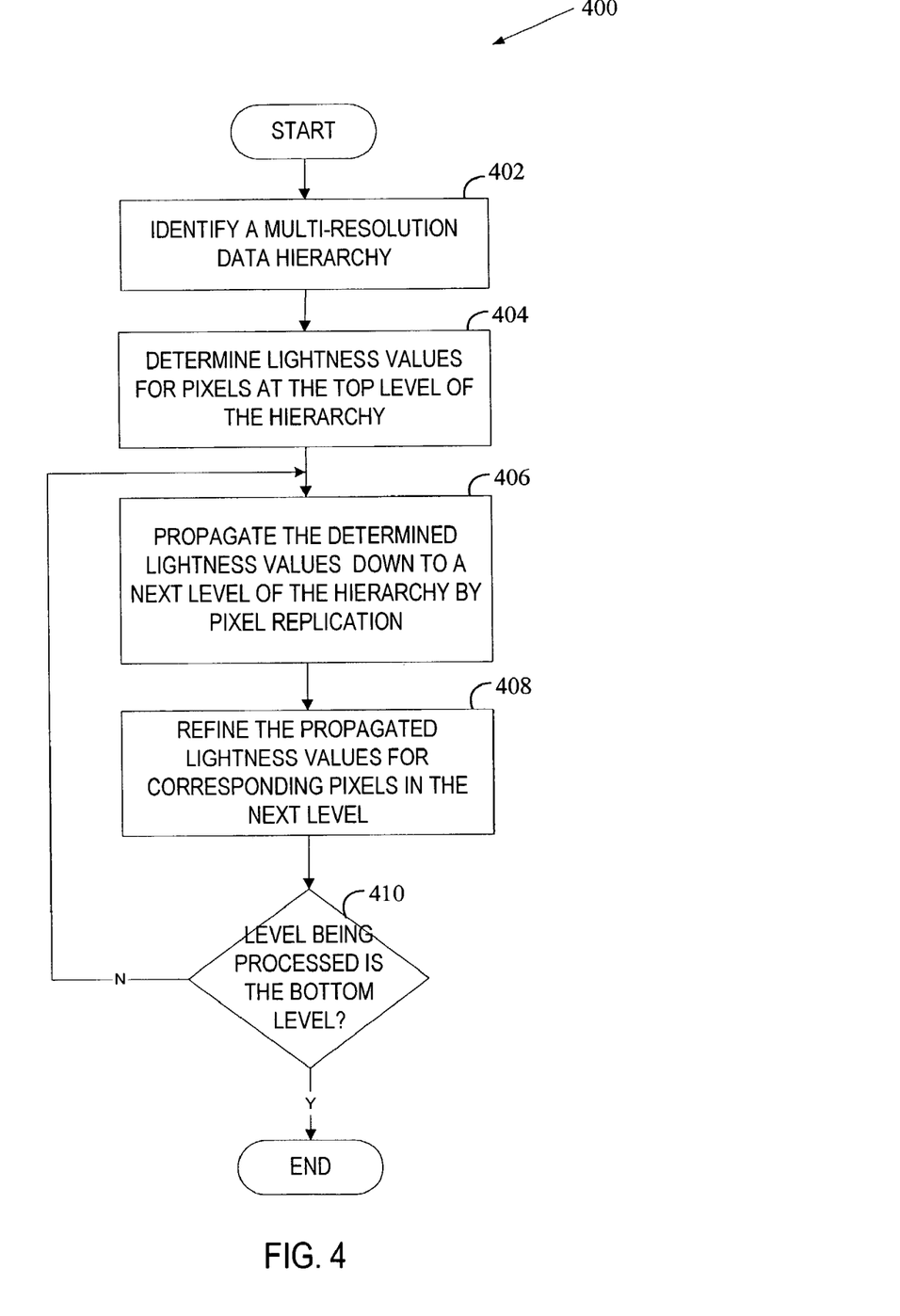
FIG. 4 is a flow diagram of one embodiment of a method for reconstructing an image using a wavelet-based retinex algorithm.

FIG. 4 is a flow diagram of a method 400 for enhancing an image using a wavelet-based retinex algorithm. Initially, method 400 begins with processing logic identifying a multi-resolution data hierarchy (processing block 402). In one embodiment, a separate multi-resolution data hierarchy exists for each of spatial domains Y, U, and V, as discussed in more detail above. In this embodiment, the following steps of method 400 are performed for each spatial domain.

At processing block 404, processing logic determines lightness values for pixels at the top level (i.e., the lowest resolution level) of the hierarchy. Based on the wavelet transform, the lightness value for each pixel is determined by iteratively performing calculations that include combining an average value between this pixel and one or more of its neighboring pixels and a difference value between this pixel and its neighboring pixels. In one embodiment, the calculations are performed with respect to the horizontal and vertical neighbors of the pixel. That is, a four-point neighborhood is used. Alternatively, the calculations are performed with respect to the horizontal, vertical and diagonal neighbors of the pixel, using an eight-point neighborhood.

At processing block 406, processing logic propagates, by pixel replication, the lightness values determined at the top level down to the next level of the hierarchy.

At processing block 408, processing logic refines the propagated lightness values for pixels in the next level by using each propagated lightness value as an input to the iterative calculations described above for a corresponding pixel at this level.

At processing block 410, processing logic determines whether the next level is the bottom level of the hierarchy (decision box 412). If the determination is positive, method 400 stops. Otherwise, method 400 continues until the calculations for the bottom level of the hierarchy are completed.

In one embodiment, in which the wavelet-based retinex algorithm uses Haar wavelets, every step of the wavelet-based retinex algorithm includes an extra operation consisting of folding out the alternate strips of the wavelet decomposition between the previous decoding and the current decoding.

The wavelet-based retinex algorithm will now be discussed in more detail. As discussed above, the wavelet-based retinex algorithm is a modified McCann '99 retinex algorithm that uses a wavelet transform. The McCann '99 retinex algorithm is a multiresolution version of the original retinex algorithm in which the multiresolution approach is used to generate computational speed. Since in the McCann '99 retinex algorithm the individual steps taken to iterate the algorithm on each band are to the nearest neighbor and consist of combining an average value with a differencing value, the similarity with the Haar wavelet transform is apparent. Specifically, the methodology of the McCann '99 retinex algorithm is to first process the image by taking its point wise logarithm. The image is then subsampled down until its dimensions are odd (relative to prime to 2). In rebuilding the image, the subsampled image at scale k is replicated to the size of the subsampled image at scale k−1. Next, for each point P on the replicated image, the following step is iterated over each neighbor Q:

$$P = \frac{(P + f(Q + (p - q)))}{2}, \quad (1)$$

where p and q are the (log) pixel values at the corresponding points in the subsampled image and $f$ is the threshold function:

$$f(x) = \begin{cases} x & \text{if } x < \max \\ \max & \text{otherwise} \end{cases},$$

where x is the value of the pixel and max is the maximum value of the pixels. The initial replicated image at the lowest resolution is set to this maximum value as well.

If the threshold function $f(x)$ is ignored, expression 1 can be written as follows:

$$P = \frac{(P + (Q + (p - q)))}{2} = \frac{(P + Q)}{2} + \frac{(p - q)}{2}.$$

In the special case of square images that are an even power of 2 on a die, the algorithm without the threshold function has, as its iteration step, the scaling and wavelet components of a Haar wavelet decomposition. Since the global average has been set to the maximum value, it raises the average pixel value to this level.

Because the algorithm uses all neighbors, it actually performs this operation twice, once in the horizontal and vertical plane, and one in the diagonal plane. Iteration results in "averaging down" the global average.

With the thresholding function $f$ active, the reconstruction is clipped asymmetrically on sufficiently high gradients or at sufficiently high edges. This causes a diffusion process, which is common to color constancy algorithm as well known in the prior art.

In summary, the McCann '99 retinex algorithm is essentially a redundant inverse Haar wavelet decomposition when it is run only on horizontal and vertical neighbors. Consequently, the McCann '99 retinex algorithm can be re-written to work from the Haar decomposition, resulting in a more computationally efficient algorithm because all the information to process the paths associated with horizontal and vertical neighbors of a pixel is contained in the wavelet decomposition. Further, the resultant wavelet-based retinex algorithm allows the substitution of other wavelet bases for the Haar basis used in the retinex method. Based on experiments, the diffusion of color and color constancy can be improved by replacing the Haar wavelets with linear approximation wavelets described by Wim Sweldens and Peter Scjroder in "Buiding Your Own Wavelets at Home," 1997, the teachings of which are incorporated herein by reference. As discussed above, the wavelet-based retinex algorithm may operate with a four-point neighborhood (horizontal and vertical neighbors of a pixel), or alternatively with an eight-point neighborhood (horizontal, vertical and diagonal neighbors of a pixel).

Recasting of the McCann '99 retinex algorithm in wavelets results in the replacement of its two arithmetic components (i.e., P+Q and p−q, above) due to the wavelet transform functionality. The wavelet-based retinex algorithm may be further generalized by replacing the thresholding function $f$ with a function having a different definition. According to the McCann '99 retinex algorithm, $f$ represents a half-sigmoid function, or a sigmoid function with lower threshold of zero. The iterative nature of the algorithm essentially takes the following step after the first iteration:

$$P=P+f(Q+f(Q\text{'s neighbor})+(p-q)). \quad (3)$$

Regarding the pixel on the subsampled screen as a bias term, this sums the inputs to Q, applies thresholding and sends the signal to P. It has been shown that there are a wide variety of sigmoid functions which properly function in this capacity. For example, the thresholding conditions may be substituted by a logistic function and a flat "linear" sigmoid curve. Different definitions of the thresholding function result in different properties of the enhanced image. Accordingly, a specific thresholding function may be selected for use with the wavelet-based retinex algorithm to tune to certain image properties. Furthermore, the selection of the pixel's neighbors in a feedback structure defined by expression 3 may vary to tune to certain image properties. In one embodiment, the image's diffusion properties and shapes can be controlled by varying the definition of thresholding function and/or the selection of the pixel's neighbors in the feedback structure used in iterations of the wavelet-based retinex algorithm.

The effect of the wavelet-based retinex algorithm on diffusion will now be specifically discussed. As known in the art, in the original retinex calculation, infinite path lengths result in only a scaled version of the image. This is also true for the wavelet-based retinex algorithm when the original thresholding function of the McCann '99 retinex algorithm is used because the wavelet-based retinex algorithm then has only two fixed points:

$$P = \max, \text{ and, } P = \frac{P-(Q-(p-q))}{2}, \text{ or, } P-Q = p-q. \quad (4)$$

Based on the above, an assumption can be made that the wavelet-based retinex algorithm stretches or contracts the image such that the image preserves order. Accordingly, the wavelet-based retinex algorithm can be used as a diffusion algorithm. In particular, diffusion in the wavelet-based retinex algorithm works as follow. The quantity that distributes itself outward over the iterated image array is in all cases the steepness of an edge emanating from the wavelet component (p−q). Consequently, it is possible to generate a differential in color from drawing on a single wavelet deposition band. Because there is no communication from higher bands to lower bands, a point in the highest band will diffuse over the image when that band's iterations are performed, exclusively. If, for example, the image contains no other features, the final image, iterated indefinitely, will be with each point colored in proportion to the number and length of the paths that arrive at that point from the disturbance. Note that for this model, the image cannot settle in the continuous case, as neither of the criteria above can be satisfied for every point. However, a discrete valued image could arrive at a fixed state, due to the granularity of the averaging process.

In one dimension, the color from a single depression cannot pass the global maximum. The effect rules out certain paths in the iteration of the wavelet-based retinex algorithm, affecting it far more than the McCann '99 retinex algorithm, when the wavelet-based retinex algorithm lacks diagonal components. Because the components are missing, the length of a path around a global maximum is longer in the wavelet-based retinex algorithm, and the "shadow" resulting is, therefore, more pronounced. Thus, a single Haar coefficient may create a situation which is not as stable and may only become so by the granularity of the color spectrum and its interaction with the averaging process. Such image "dipole" is illustrated in FIG. 5.

Figure 5:
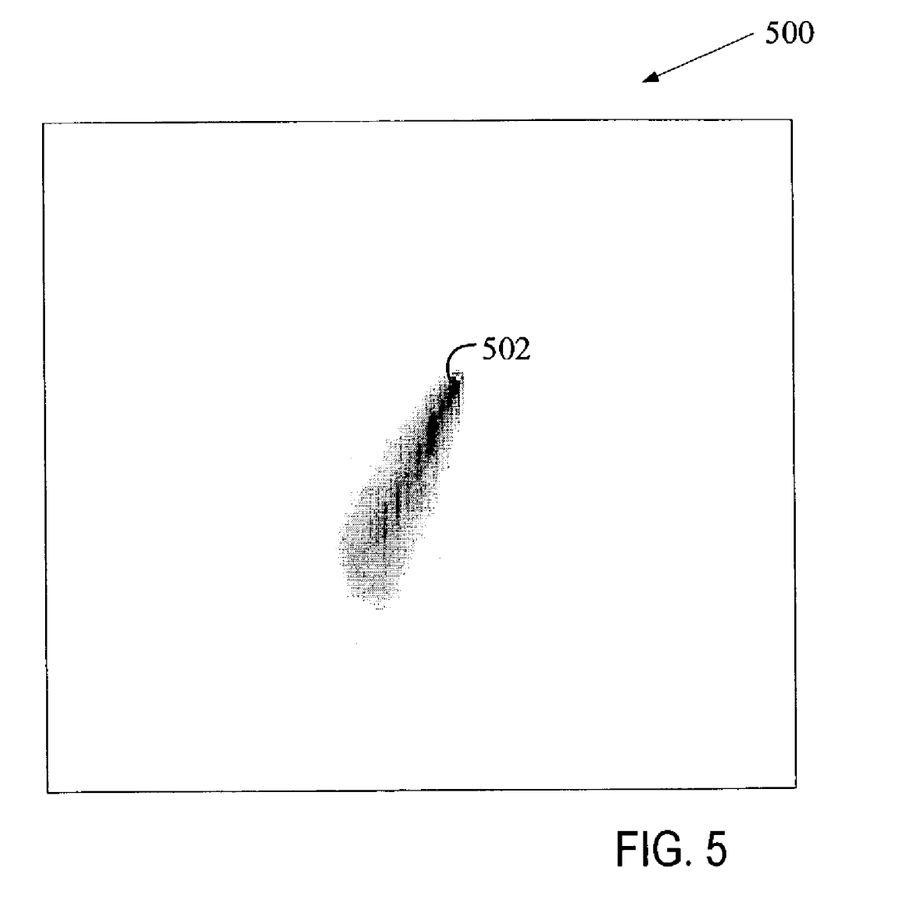
FIG. 5 illustrates an exemplary image dipole constructed using a wavelet-based retinex algorithm.

Referring to FIG. 5, an image dipole is constructed in the wavelet domain by an edge of a single pixel 502. As shown, the color bleeds indefinitely into an otherwise blank image 500. This functionality of the wavelet-based retinex algorithm can be used in a sketching or drawing application.

Accordingly, using the artifice of dropping color coefficients into the wavelet transform or into a blank screen that is then interpreted as a wavelet transform may be used to determine the diffusion away from arbitrary edges for each wavelet transform and threshold pair examined.

Based on the above, the wavelet-based retinex algorithm, for limited iterations, may be considered the inverse operation to an image segmentation algorithm for gray scale images that is known in the art as a watershed algorithm. Whereas the watershed algorithm labels or colors points by their paths away from boundaries, towards the region minimum, the wavelet-based retinex algorithm spreads the edges contributing to the minimum outward until it encounters the boundaries.

The use of a wavelet-based retinex algorithm in image enhancement has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A method for processing an image, the method comprising:

receiving image data identifying a plurality of pixels in the image;

creating a multi-resolution hierarchy from the image data; and determining output values for the plurality of pixels using a wavelet-based retinex algorithm by propagating pixel values computed at lower resolution levels of the multi-resolution hierarchy to higher resolution levels of the multi-resolution hierarchy and refining the propagated pixel values at the higher resolution levels.

2. The method of claim 1 wherein creating the multi-resolution hierarchy comprises assigning a YUV to each of the plurality of pixels, wherein Y represents luminance, U represents a first color and V represents a second color.

3. The method of claim 1 wherein refining the propagated pixel values comprises iteratively applying the wavelet-based retinex algorithm to each of the plurality of pixels at each of the higher resolution levels using a corresponding one of the propagated pixel values.

4. The method of claim 1 wherein the wavelet-based retinex algorithm is defined by rewriting a multi-resolution retinex algorithm using a wavelet transform algorithm, the multi-resolution retinex algorithm operating according to the formula:

$$P = \frac{(P + f(Q + (p - q)))}{2}, \quad (1)$$

where P is a lightness value at point P, Q is a lightness value at point Q which is a neighbor of point P, p and q are logarithmic values of P and Q respectively, and f is a thresholding function.

5. The method of claim 4 wherein the wavelet transform algorithm is a Haar transform algorithm.

6. The method of claim 4 wherein the neighbor of point P is at least one of a horizontal neighbor of point P and a vertical neighbor of point P.

7. The method of claim 4 wherein the neighbor of point P is at least one of a horizontal neighbor of point P, a vertical neighbor of point P, and a diagonal neighbor of point P.

8. The method of claim 4 wherein the thresholding function is defined as f(x), where f(x) is equal to value x of a corresponding pixel if value x is less than the maximum value of the plurality of pixels and f(x) is equal to the maximum value of the plurality of pixels if x is not less than the maximum value of the plurality of pixels.

9. The method of claim 4 further comprising:

modifying a definition of the thresholding function to adjust the wavelet-based retinex algorithm according to a specific property of the image.

10. The method of claim 9 wherein the definition of the thresholding function is modified using at least one of a logistic function and a flat linear sigmoid function.

11. The method of claim 4 further comprising:

modifying one or more operational parameters of the wavelet-based retinex algorithm to control diffusion of color in the image.

12. The method of claim 11 wherein the one or more operational parameters pertain to at least one of the thresholding function and a selection of neighbors for point P.

13. A computer readable medium that provides instructions, which when executed on a processor cause the processor to perform a method comprising:

receiving image data identifying a plurality of pixels in the image;

creating a multi-resolution hierarchy from the image data; and determining output values for the plurality of pixels using a wavelet-based retinex algorithm by propagating pixel values computed at lower resolution levels of the multi-resolution hierarchy to higher resolution levels of the multi-resolution hierarchy and refining the propagated pixel values at the higher resolution levels.

14. The computer readable medium of claim 13 wherein the wavelet-based retinex algorithm is defined by rewriting a multi-resolution retinex algorithm using a wavelet transform algorithm, the multi-resolution retinex algorithm operating according to the formula:

$$P = \frac{(P + f(Q + (p - q)))}{2}, \quad (1)$$

where P is a lightness value at point P, Q is a lightness value at point Q which is a neighbor of point P, p and q are logarithmic values of P and Q respectively, and f is a thresholding function.

15. The computer readable medium of claim 14 wherein the wavelet transform algorithm is a Haar transform algorithm.

16. The computer readable medium of claim 14 wherein the neighbor of point P is at least one of a horizontal neighbor of point P and a vertical neighbor of point P.

17. The computer readable medium of claim 14 wherein the thresholding function is defined as f(x), where f(x) is equal to value x of a corresponding pixel if value x is less than the maximum value of the plurality of pixels and f(x) is equal to the maximum value of the plurality of pixels if x is not less than the maximum value of the plurality of pixels.

18. The computer readable medium of claim 14 wherein the method further comprises:

modifying a definition of the thresholding function to adjust the wavelet-based retinex algorithm according to a specific property of the image.

19. The computer readable medium of claim 18 wherein the definition of the thresholding function is modified using at least one of a logistic function and a flat linear sigmoid function.

20. The computer readable medium of claim 14 wherein the method further comprises:

modifying one or more operational parameters of the wavelet-based retinex algorithm to control diffusion of color in the image.

21. The computer readable medium of claim 20 wherein the one or more operational parameters pertain to at least one of the thresholding function and a selection of neighbors for point P.

22. A computerized system comprising:

a memory; and at least on processor coupled to the memory, the processor executing a set of instructions which cause the processor to receive image data identifying a plurality of pixels in the image;

create a multi-resolution hierarchy from the image data, and determine output values for the plurality of pixels using a wavelet-based retinex algorithm by propagating pixel values computed at lower resolution levels of the multi-resolution hierarchy to higher resolution levels of the multi-resolution hierarchy and refining the propagated pixel values at the higher resolution levels.

23. The computerized system of claim 22 wherein the processor is to refine the propagated pixel values by iteratively applying the wavelet-based retinex algorithm to each of the plurality of pixels at each of the higher resolution levels using a corresponding one of the propagated pixel values.

24. The computerized system of claim 22 wherein the wavelet-based retinex algorithm is defined by rewriting a multi-resolution retinex algorithm using a wavelet transform algorithm, the multi-resolution retinex algorithm operating according to the formula:

$$P = \frac{(P + f(Q + (p-q)))}{2}, \quad (1)$$

where P is a lightness value at point P, Q is a lightness value at point Q which is a neighbor of point P, p and q are logarithmic values of P and Q respectively, and f is a thresholding function.

25. The computerized system of claim 24 wherein the thresholding function is defined as f(x), where f(x) is equal to value x of a corresponding pixel if value x is less than the maximum value of the plurality of pixels and f(x) is equal to the maximum value of the plurality of pixels if x is not less than the maximum value of the plurality of pixels.

26. The computerized system of claim 24 wherein the processor is further to modify one or more operational parameters of the wavelet-based retinex algorithm to control diffusion of color in the image.

27. The computerized system of claim 26 wherein the one or more operational parameters pertain to at least one of the thresholding function and a selection of neighbors for point P.

28. An apparatus for processing an image, the apparatus comprising:

an image transformer to receive image data identifying a plurality of pixels in the image and to transform the image data; and an image enhancer to create a multi-resolution hierarchy from the transformed image data and to determine output values for the plurality of pixels using a wavelet-based retinex algorithm by propagating pixel values computed at lower resolution levels of the multi-resolution hierarchy to higher resolution levels of the multi-resolution hierarchy and refining the propagated pixel values at the higher resolution levels.

29. The apparatus of claim 28 wherein the image enhancer is to refine the propagated pixel values by iteratively applying the wavelet-based retinex algorithm to each of the plurality of pixels at each of the higher resolution levels using a corresponding one of the propagated pixel values.

30. The apparatus of claim 29 wherein the wavelet-based retinex algorithm is defined by rewriting a multi-resolution retinex algorithm using a wavelet transform algorithm the multi-resolution retinex algorithm operating according to the formula:

$$P = \frac{(P + f(Q + (p-q)))}{2}, \quad (1)$$

where P is a lightness value at point P, Q is a lightness value at point Q which is a neighbor of point P, p and q are logarithmic values of P and Q respectively, and f is a thresholding function.

31. The apparatus of claim 30 wherein the image enhancer is further to modify one or more operational parameters of the wavelet-based retinex algorithm to control diffusion of color in the image.

32. The apparatus of claim 31 wherein the one or more operational parameters pertain to at least one of the thresholding function and a selection of neighbors for point P.

* * * * *